United States Patent [19]
Kurumida

[11] Patent Number: 5,859,647
[45] Date of Patent: Jan. 12, 1999

[54] DATA PROCESSING APPARATUS AND METHOD AND OUTPUT DEVICE

[75] Inventor: Tsuneaki Kurumida, Kawasaki, Japan

[73] Assignee: Canon Kabushiki Kaisha, Tokyo, Japan

[21] Appl. No.: 543,311

[22] Filed: Oct. 16, 1995

[30] Foreign Application Priority Data

Oct. 19, 1994 [JP] Japan .................................. 6-253725

[51] Int. Cl.⁶ .................................................. G06T 11/00
[52] U.S. Cl. ............................................ 345/442; 345/469
[58] Field of Search .................................... 395/167, 170, 395/169, 142; 345/144, 441, 442, 467, 469, 471, 472, 142, 948

[56] References Cited

U.S. PATENT DOCUMENTS

| | | | |
|---|---|---|---|
| 5,241,654 | 8/1993 | Kai et al. .................................. | 345/442 |
| 5,309,521 | 5/1994 | Matsukawa .............................. | 345/131 |
| 5,309,554 | 5/1994 | Ito .............................................. | 395/170 |
| 5,381,521 | 1/1995 | Ballard .................................... | 345/442 |
| 5,430,834 | 7/1995 | Takahashi et al. ....................... | 395/142 |
| 5,469,513 | 11/1995 | Kurumida ................................ | 382/203 |
| 5,500,927 | 3/1996 | Sander-Cederlof et al. ........... | 345/433 |
| 5,568,601 | 10/1996 | Yamauchi et al. ....................... | 395/142 |
| 5,577,177 | 11/1996 | Collins et al. ........................... | 345/469 |

*Primary Examiner*—Joseph H. Feild
*Attorney, Agent, or Firm*—Fitzpatrick, Cella, Harper & Scinto

[57] ABSTRACT

It is an object to convert to outline font data that is closer to an actual character outline. A check is made to see if the data read out from a memory is which one of straight line data and curve data. In case of the curve data, a check is made to see if an extremum exists in a curve formed by the curve data. If YES, the curve is divided into segments at the position of the extremum. The curve data obtained by dividing the curve into the segments and the straight line data judged to be the straight line are stored in the memory, thereby realizing the object.

15 Claims, 7 Drawing Sheets

BEZIER CURVE

DATA PROCESSING APPARATUS AND METHOD AND OUTPUT DEVICE

BACKGROUND OF THE INVENTION

1. Field of the Invention

The invention relates to a data processing apparatus and method for converting outline font data which expresses an outline of a character by straight line and curve data into outline font data that is closer to an actual character outline.

2. Related Background Art

Hitherto, as for the outline font, in the case where the outline of a character is a straight line, both end points of the straight line are stored and, in the case where the outline is a curve, coordinates and attributes of a control point comprising end points and an intermediate point to specify the curve are stored, and the outline font is developed in a bit map on the basis of the control point.

However, in case of expressing the outline of a character which includes a long curve, the coordinates of the intermediate point and actual coordinates on the character are away from each other as shown in, for example, FIG. 10. Therefore, when developing the area which is occupied by the character into the bit map, the size of the area that is actually needed cannot be calculated accurately. Therefore, memories of a number larger than the necessary number must be provided.

As shown in FIG. 11, on the other hand, in case of using, for instance, a Bezier curve as a curve, since a control point and the curve excluding the end points of the Bezier curve are away from each other, an accurate character frame from the Bezier curve will be obtained.

SUMMARY OF THE INVENTION

According to an embodiment of the invention, it is an object to provide a data processing apparatus and method which can solve the problems as mentioned above and can convert into outline font data that is closer to an actual character outline.

Another object of the invention is to provide an output device having a data processing function which can convert into outline font data that is closer to an actual character outline.

According to the invention, the above objects are accomplished by a data processing apparatus comprising: figure data storage means in which figure data consisting of straight line data and curve data has been stored; judging means for judging that the data read out from the figure data storage means is which one of the straight line data and the curve data; extremum judging means for judging whether any extremum exists in the curve which is formed by the curve data in the case where it is judged by the judging means that the data is the curve data; dividing means for dividing the curve into segments on the basis of the extremum in the case where it is judged to be YES by the extremum judging means; and memory means for storing the curve data obtained by dividing the curve into the segments by the dividing means and the data of the straight line that is judged to be a straight line by the judging means.

In the above data processing apparatus, the figure data is outline font data.

In the above data processing apparatus, the dividing means divides the curve into the segments at the position of the extremum in the case where it is judged to be YES by the extremum judging means.

In the above data processing apparatus, the figure data is inputted to the apparatus through communicating means connected to the apparatus.

In the above data processing apparatus, the figure data is data of a cubic Bezier curve.

In the above data processing apparatus, the figure data is data of a quadratic Bezier curve.

In the above data processing apparatus, the figure data is data of a cubic B spline curve.

In the above data processing apparatus, the figure data is data of a quadratic B spline curve.

According to the invention, the above objects are accomplished by a data processing method comprising: a step of reading out data from figure data storage means in which figure data consisting of straight line data and curve data has been stored; a judging step of judging that the read-out data is which one of the straight line data and the curve data; a step of storing the data of the straight line in the case where it is judged that the read-out data is the straight line data; an extremum judging step of judging whether an extremum exists in a curve that is formed by the curve data or not in the case where it is judged that the read-out data is the curve data; a dividing step of dividing the curve into segments on the basis of the extremum in the case where it is judged to be YES in the extremum judging step; and a storing step of storing the curve data obtained by dividing the curve into the segments.

In the above data processing method, the figure data is outline font data.

In the above data processing method, in the dividing step, when it is judged to be YES in the extremum judging step, the curve is divided into the segments at the position of the extremum.

In the above data processing method, a step of inputting the figure data to the apparatus through communicating means connected to the apparatus.

In the above data processing method, the figure data is data of a cubic Bezier curve.

In the above data processing method, the figure data is data of a quadratic Bezier curve.

In the above data processing method, the figure data is data of a cubic B spline curve.

In the above data processing method, the figure data is data of a quadratic B spline curve.

An output device according to the invention has a construction of the above data processing apparatus and output means for outputting a character pattern on the basis of the data stored in the storage means.

The above output device further has: means for scaling in accordance with a character size and obtaining a character BBox; and means for calculating a necessary memory size by using the character BBox obtained and for setting a work area into a memory on the basis of the calculated memory size.

In the data processing apparatus according to the invention, the judging means judges that the data read out from the figure data storage means is which one of the straight line data or curve data, and when it is judged to be the curve data, the extremum judging means judges whether the extremum exists in the curve that is formed by the curve data or not, and when it is judged to be YES, the curve is divided into the segments by the dividing means on the basis of the extremum, and the curve data obtained by dividing the curve into the segments and the straight line data judged to be the straight line by the judging means are stored in the memory means.

In the data processing method according to the invention, the data is read out from the figure data storage means in which the figure data consisting of the straight line data and curve data has been stored, whether the read-out data is the straight line data or the curve data is judged, and when it is judged to be the straight line data, the straight line data is stored, and when it is judged to be the curve data, whether the extremum exists in the curve that is formed by the curve data or not is judged, and when it is judged to be YES, the curve is divided into the segments on the basis of the extremum, and the curve data obtained by dividing the curve into the segments is stored.

In the output device according to the invention, a character pattern is outputted by the output means on the basis of the data stored in the storage means of the data processing apparatus.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described in detail hereinbelow with reference to the drawings.

First Embodiment

Figure 1:
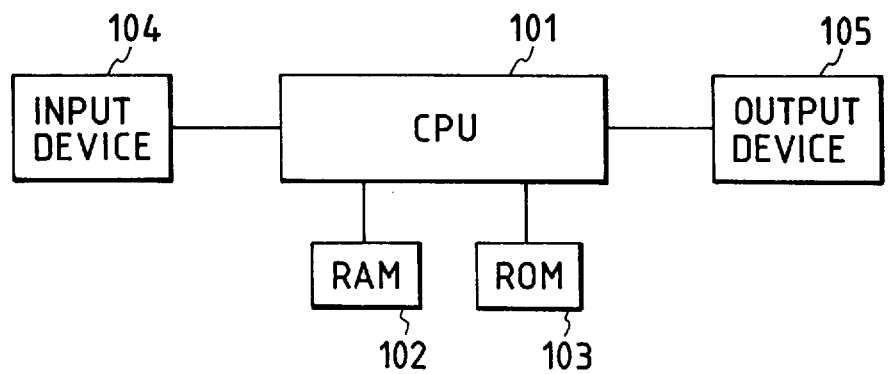
FIG. 1 is a block diagram showing the first embodiment of the invention.

FIG. 1 shows the first embodiment of the invention. In FIG. 1, reference numeral 101 denotes a CPU (central processing unit) for executing control and processes of the entire apparatus; 102 RAM (random access memory) which is used as a temporary storage area by the CPU 101; 103 ROM (read only memory) in which an outline font conversion processing program that is executed by the CPU 101 and data have been stored; 104 an input device to input data to be processed by the apparatus; and 105 an output device such as printer, display, or the like for outputting the data processed by the apparatus.

An example of outline font data as a processing target is shown in Table 1.

TABLE 1

| X coordinate | Y coordinate | Flag |
| --- | --- | --- |
| 0 | 200 | 0 |
| 100 | 200 | 1 |
| 160 | 200 | 0 |
| 200 | 160 | 0 |
| 200 | 100 | 1 |
| 200 | 40 | 0 |
| 160 | 0 | 0 |
| 100 | 0 | 0 |
| 0 | 0 | −1 |
| 20 | 20 | 0 |
| 95 | 20 | 1 |
| 140 | 20 | 0 |
| 180 | 60 | 0 |
| 180 | 100 | 1 |
| 180 | 140 | 0 |
| 140 | 180 | 0 |
| 95 | 180 | 0 |
| 20 | 180 | −2 |

The outline font data comprises a straight line showing an outline of a character and a cubic Bezier curve. In Table 1, the X coordinate and the Y coordinate are an X coordinate and a Y coordinate of a control point of the outline, respectively. When a flag is equal to 1, the point shown by the X and Y coordinates indicates a start point of a cubic Bezier curve expressed by four continuous points including the control point. When the flag is equal to −1, the point shown by the X and Y coordinates indicates a last point of one outline. When the flag is equal to −2, such a point indicates the last of the data of the character.

The cubic Bezier curve is expressed by the following equations (1).

$$x = P0_x(1-t)^3 + 3P1_x t(1-t)^2 + 3P2_x t^2(1-t) + P3_x t^3 \quad (1)$$

$$y = P0_y(1-t)^3 + 3P1_y t(1-t)^2 + 3P2_y t^2(1-t) + P3_y t^3$$

Figure 2:
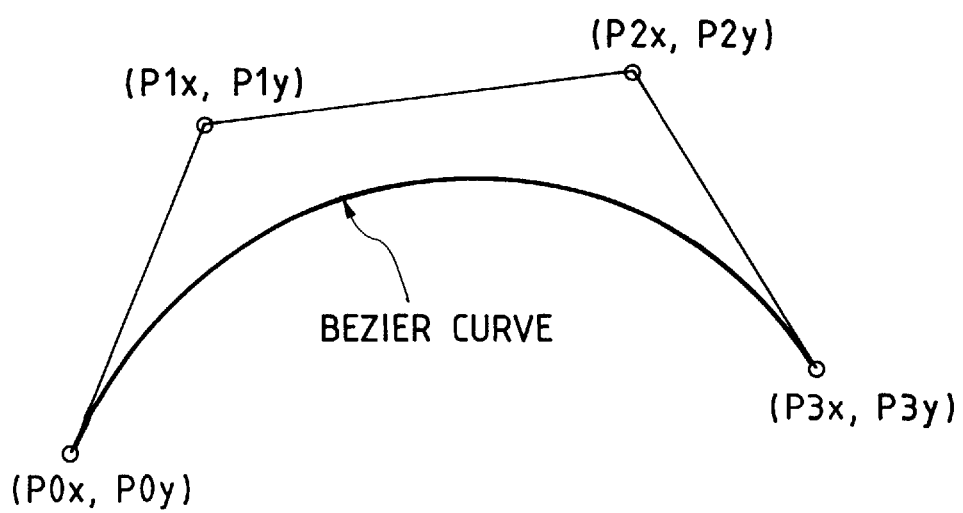
FIG. 2 is an explanatory diagram for explaining that a cubic Bezier curve has come into contact with a rectangle comprising end points and intermediate points at only both end points and is interpolated therein.

The cubic Bezier curve shown as mentioned above is in contact with a rectangle constructed by end points and intermediate points at only both end points thereof and is interpolated in such a rectangle as shown in, for example, FIG. 2.

Figure 3:
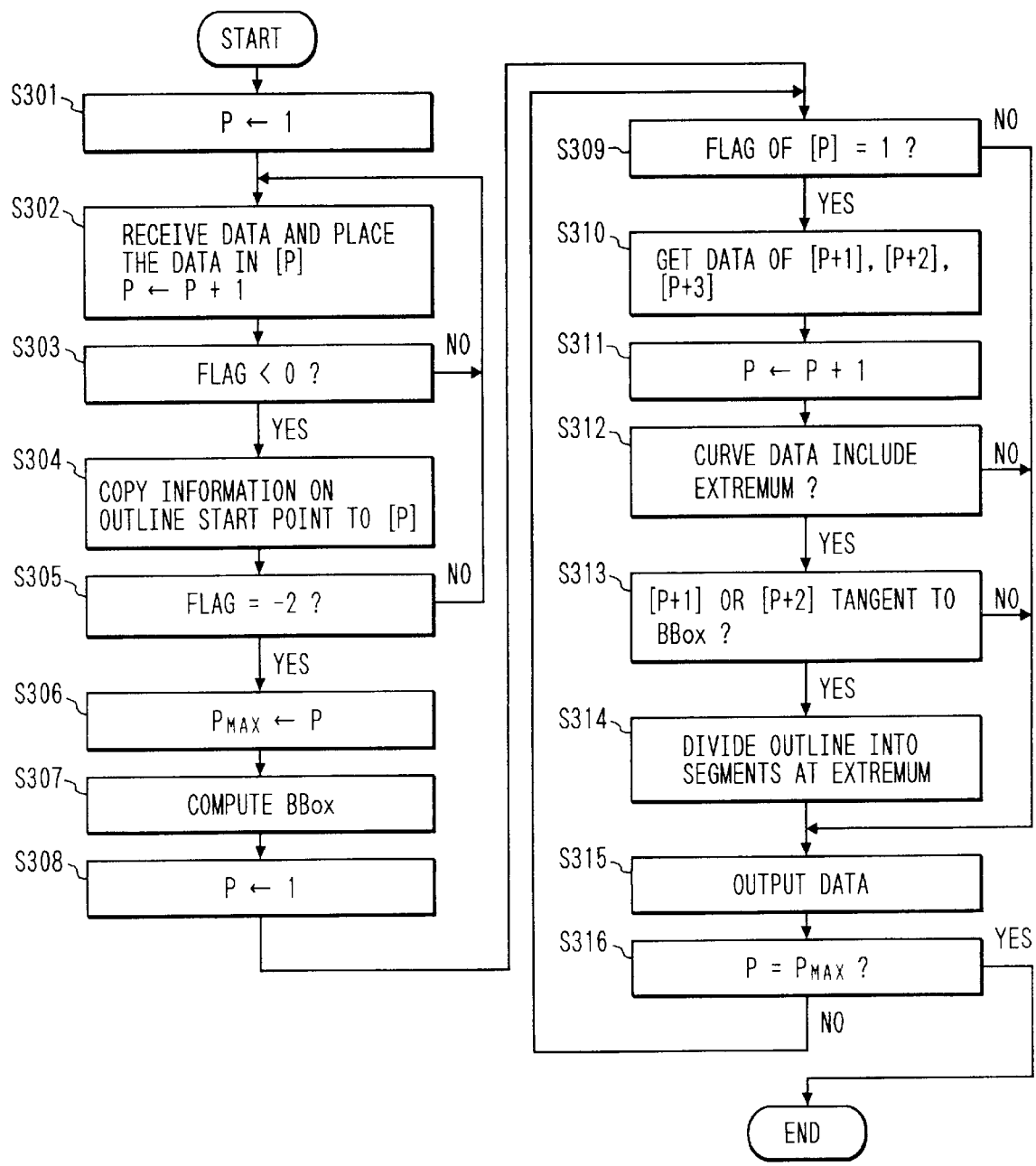
FIG. 3 is a flowchart showing an example of an outline font conversion processing program which is stored in an ROM 103 shown in FIG. 1 in the first embodiment.

FIG. 3 is a flowchart showing an example of the outline font conversion processing program which is stored in the ROM 103 shown in FIG. 1.

In step S301, a pointer p indicative of the position of an array is initialized. In step S302, when outline point information is received through the input device 104, the outline point information is placed at the position of the array p and the value of p is increased by only "1". In step S303, a check is made to see if the flag is negative or positive. When it is negative, information at the start point of the outline is extracted from the array and is added after the point at the present position p on the array. After that, the flag is set to 0. In step S305, a check is made to see if the flag is equal to −2 or not.

As a result of the judgment, when the flag is not equal to −2, the processing routine is returned to step S302. When the flag is equal to −2, on the other hand, the information at the start point of the outline is extracted from the array and is added after the present point on the array. In step S306, p is substituted for pmax. In step S307, the maximum and minimum values of x and y of all points on the array are obtained and those values are set to "CharBBox". Subsequently, in step S308, the pointer is set to the array start position.

In step S309, a check is made to see if the flag of the data at the position shown by the pointer is equal to 1 or not. If YES as a judgment result, the processing routine advances to step S310. In step S310, three data subsequent to the position of the pointer, namely, the (p+1)th, (p+2)th, and (p+3)th data are extracted. In step S311, the value of pointer p is increased by only "1". In step S312, a check is made to see if the extremum exists in the curve data which is calculated from the coordinate values or not.

A judging method will now be described in detail. For x and y from the control point of the Bezier curve shown by the equations (1), they are obtained as follows.

$$x = (P3_x - 3P2_x + 3P1_x - P0_x)t^3 + \qquad (2)$$
$$3(P2_x - 2P1_x + P0_x)t^2 + 3(P1_x - P0_x)t + P0_x$$
$$y = (P3_y - 3P2_y + 3P1_y - P0_y)t^3 +$$
$$3(P2_y - 2P1_y + P0_y)t^2 + 3(P1_y - P0_y)t + P0_y$$

By differentiating the above equations (2), $$dx/dt = 3(P3_x - 3P2_x + 3P1_x - P0_x)t^2 + \qquad (3)$$
$$6(P2_x - 2P1_x + P0_x)t + 3(P1_x - P0_x)$$
$$dy/dt = 3(P3_y - 3P2_y + 3P1_y - P0_y)t^2 +$$
$$6(P2_y - 2P1_y + P0_y)t + 3(P1_y \, P0_y)$$

is obtained. Now, assuming that
$$AX = P3_X - 3P2_X + 3P1_X - P0_X, \quad BX = P2_X - 2P1_X + P0_X,$$
$$CX = P1_X - P0_X$$
we have $$A_x t^2 + B_x t + C_x = 0 \qquad (4)$$
$$A_y t^2 + B_y t + C_y = 0$$

By solving the equation (4) with respect to t, we have $$t = (-B_x \pm \text{sqrt}(B_x^2 - 4A_x C_x))/2A_x \qquad (5)$$
$$t = (-B_y \pm \text{sqrt}(B_y^2 - 4A_y C_y))/2A_y$$

When the solutions are larger than 0 and are less than 1, so long as they are not double solutions, such a point shows the coordinates of the extremum to be obtained.

Figure 4A:
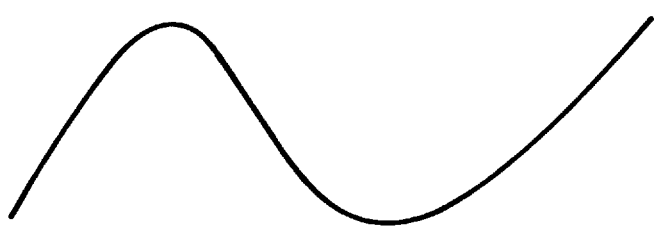
FIGS. 4A to 4C are diagrams showing an example of a cubic Bezier curve.
Figure 4B:
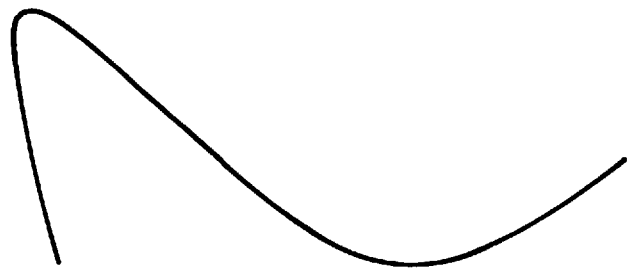
Figure 4C:
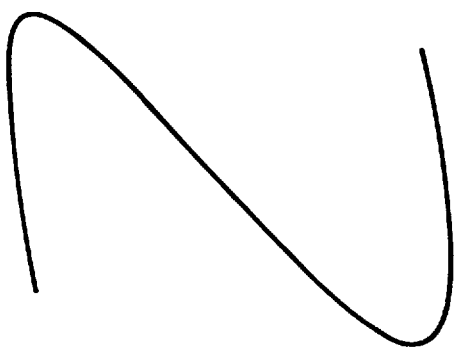

Since x and y of the Bezier curve are expressed by cubic functions in each of which t is used as a parameter, each of x and y has up to two extrema. Therefore, a Bezier curve whose extrema are equal to 0 to 4 can exist. FIG. 4A shows an example of a Bezier curve having two extrema. FIG. 4B shows an example of a Bezier curve having three extrema. FIG. 4C shows an example of a Bezier curve having four extrema.

If YES in step S312, a check is made in step S313 to see if at least one of (p+1) and (p+2) is come into contact with CharBBox or not. If YES, the outline is divided into segments at the extremum in step S314. The data is outputted in step S315.

On the other hand, when the flag is not equal to 1 in step S309, the processing routine advances to step S315.

When no extremum exists in step S312, step S315 follows.

If NO in step S313, step S315 follows.

Figure 5:
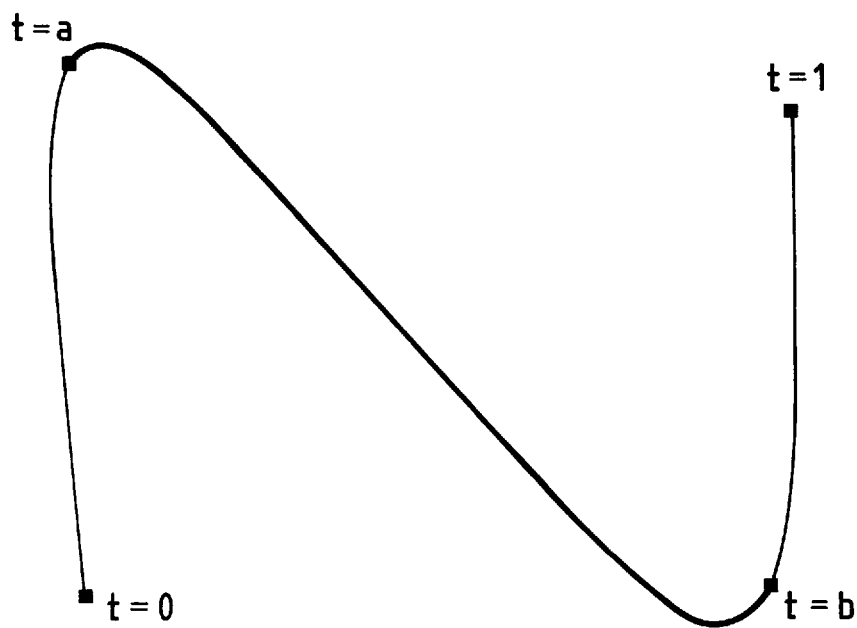
FIG. 5 is an explanatory diagram for explaining a method of dividing the cubic Bezier curve into segments.

The method of dividing the cubic Bezier curve into segments will now be described with reference to FIG. 5. Now, assuming that ($0 \leq a < b \leq 1$), in order to set an interval where t lies within a range from a to b to the cubic Bezier curve, so long as s is a parameter, it is sufficient to set the relation between t and s in a manner such that t=a when s is equal to 0 and that t=b when s is equal to 1. Therefore, by substituting t=a+(b−a)s for a cubic expression x=f(t) ($0 \leq t \leq 1$) and by expressing as an equation of s, a Bezier curve which becomes a cubic expression in an interval where s lies within a range from 0 to 1 can be expressed while setting a part of the curve to a parameter of s. By converting a coefficient of each degree of s into the coordinates of each control point, the control point of the curve can be converted.

A check is made in step S316 to see if the data up to the last data has been processed or not. If YES, the operation of the apparatus is finished. If NO, the processing routine is returned to step S309.

A character pattern is outputted to the output device 105 on the basis of the data processed in accordance with the above processing flow.

By dividing the outline into segments at the maximum and minimum values of the outline as mentioned above, the maximum area that is occupied by the outline of the character can be accurately calculated and the number of memories of the characters which are used can be minimized.

Second Embodiment

When comparing the second embodiment with the first embodiment, a curve constructing the outline font data differs. Namely, in the first embodiment, although the cubic Bezier curve has been used as a curve, a quadratic Bezier curve is used as a curve in the second embodiment.

An example of outline font data as a processing target in the embodiment is shown in Table 2.

TABLE 2

| X coordinate | Y coordinate | Flag |
|---|---|---|
| 0 | 200 | 0 |
| 100 | 200 | 1 |
| 200 | 200 | 0 |
| 200 | 100 | 1 |
| 200 | 0 | 0 |
| 100 | 0 | 0 |
| 0 | 0 | −1 |
| 20 | 20 | 0 |
| 95 | 20 | 1 |
| 180 | 20 | 0 |
| 180 | 100 | 1 |
| 180 | 180 | 0 |
| 95 | 180 | 0 |
| 20 | 180 | −2 |

The quadratic Bezier curve is expressed by the following equations.

$$x = P0_x(1-t)^2 + 2P1_x(1-t)t + P2_x t^2 \qquad (6)$$
$$y = P0_y(1-t)^2 + 2P1_y(1-t)t + P2_y t^2$$

Figure 6:
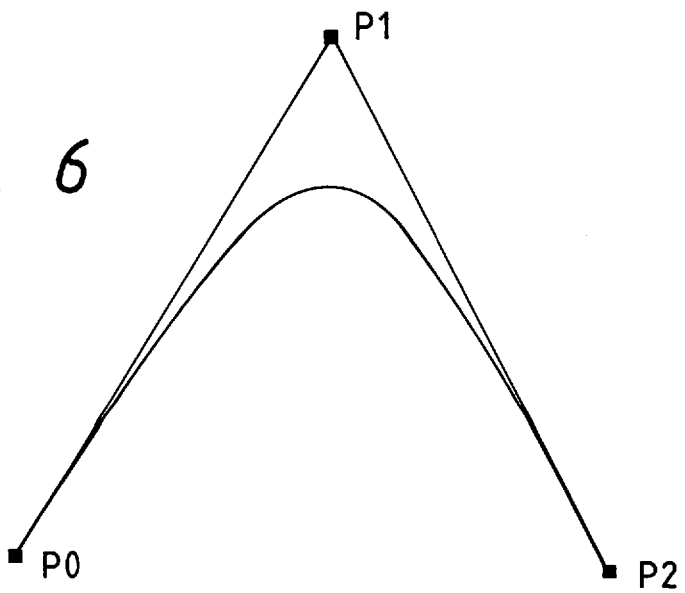
FIG. 6 is an explanatory diagram for explaining that a quadratic Bezier curve has come into contact with a triangle constructed by end points and an intermediate point at only both end points and is interpolated therewith.

For example, as shown in FIG. 6, the quadratic Bezier curve which is expressed as mentioned above is in contact with a triangle constructed by end points and an intermediate point at only both end points and is interpolated in the triangle.

Figure 7:
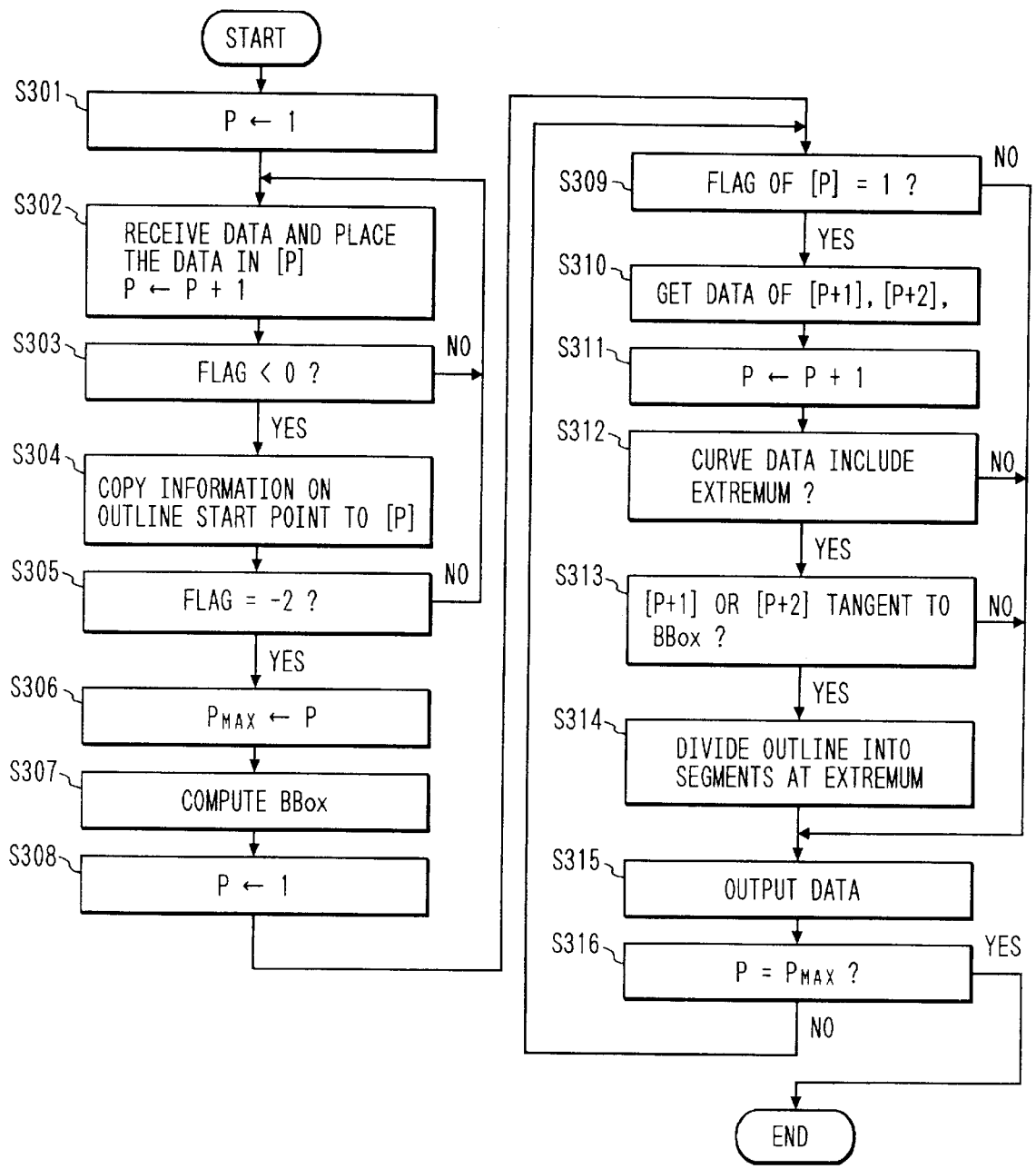
FIG. 7 is a flowchart showing an example of an outline font conversion processing program which is stored into the ROM 103 shown in FIG. 1 in the second embodiment.

FIG. 7 is a flowchart showing an example of the outline font conversion processing program which is stored in the ROM 103 shown in FIG. 1. When comparing with the flowchart shown in FIG. 3, the flowchart shown in FIG. 7 differs from it with respect to the data that is extracted when a flag of the data at the position designated by the pointer is equal to 1 as a result of judgment about whether the flag is equal to 1 or not in step S309. Namely, in the first embodiment, in step S310, three data which continue to the position of the pointer, namely, the (p+1)th, (p+2)th, and (p+3)th data are extracted in step S310 and the pointer p is increased by only 1 in step S311. On the other hand, in the embodiment, two data which continue to the pointer position, namely, the (p+1)th and (p+2)th data are extracted in step S310 and the pointer p is increased by only 1 in step S311.

Figure 8:
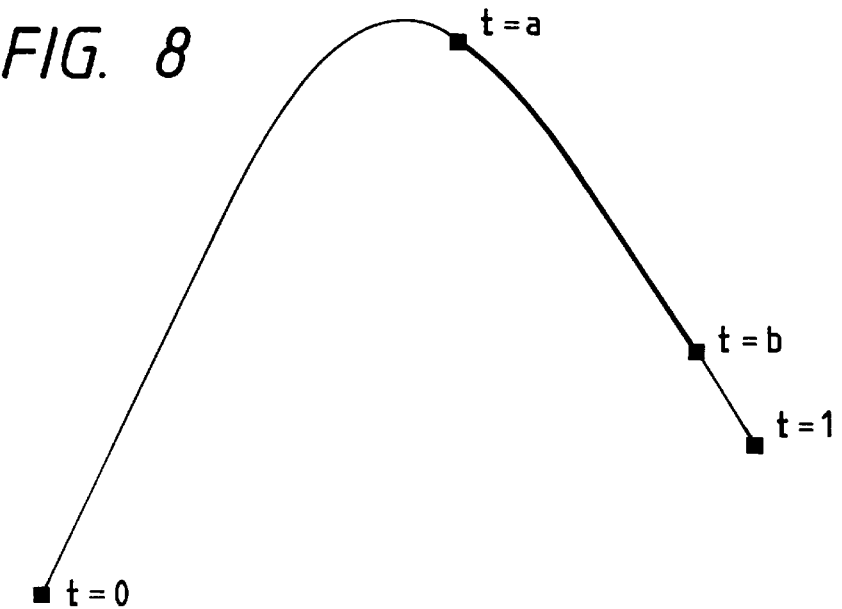
FIG. 8 is an explanatory diagram for explaining a method of dividing the quadratic Bezier curve into segments.

A method of dividing the quadratic Bezier curve into segments will now be described with reference to FIG. 8. Now, assuming that ($0 \leq a \leq b \leq 1$), in order to set an interval where t lies within a range from a to b to the quadratic Bezier curve, when s is set to a parameter, it is sufficient to set the relation between t and s in a manner such that t=a and t=b so long as s is equal to 0. Thus, by substituting t=a+(b−a)s into the quadratic expression x=f(t) ($0 \leq t \leq 1$) and expressing as an equation of s, a Bezier curve which becomes a quadratic expression for an interval where s lies within a range from 0 to 1 can be expressed while setting a part of the curve to a parameter. Now, by converting a coefficient of each degree of s into coordinates of each control point, the control point of the curve can be converted.

As mentioned above, by dividing the outline of the quadratic Bezier curve into segments at the maximum and minimum values of the outline, the maximum area that is occupied by the outline of the character can be accurately calculated and the number of memories of the characters which are used can be minimized.

Although the first and second embodiments have been described with respect to the example in which the Bezier curve is used, a cubic B spline curve, a quadratic B spline curve, or the like can be used. In case of using a curve in which no control point exists on the line, by similarly dividing the curve into the segments at the extremum, an accurate character frame can be obtained. On the other hand, even in the case where the quadratic curve is converted to the cubic curve and character data is formed again, the area that is occupied by the character does not change.

Third Embodiment

Figure 9:
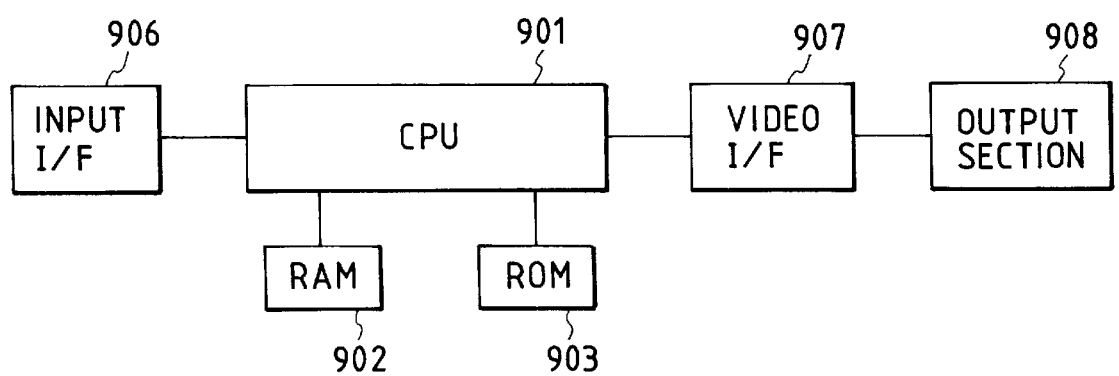
FIG. 9 is a block diagram showing the third embodiment of the invention.
Figure 10:
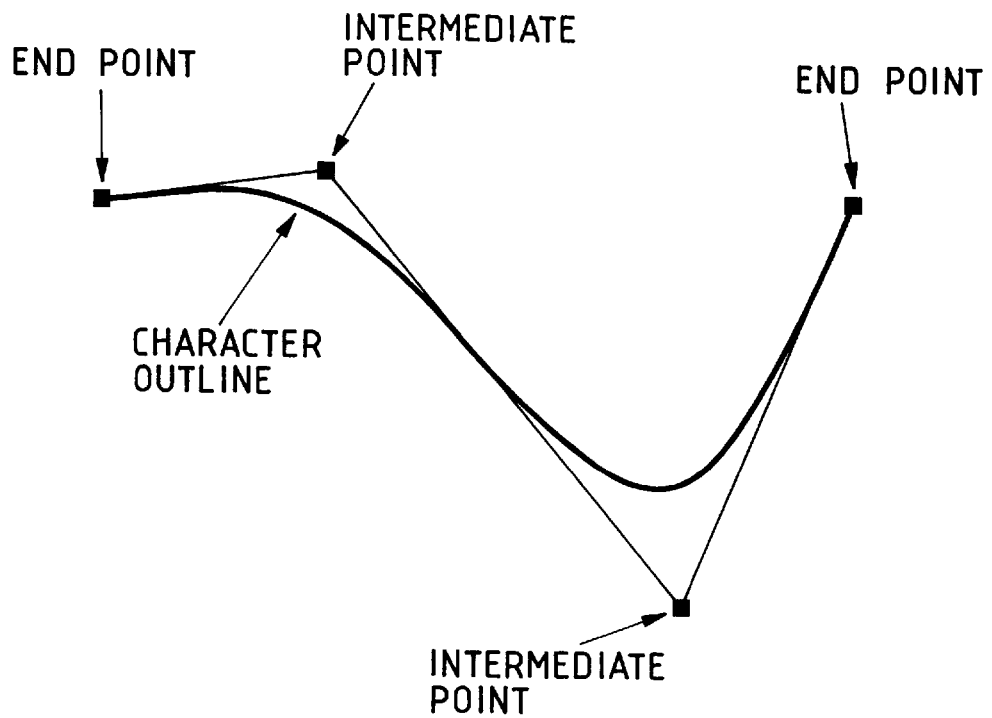
FIG. 10 is a diagram showing an example of the relation between an outline font and a curve.
Figure 11:
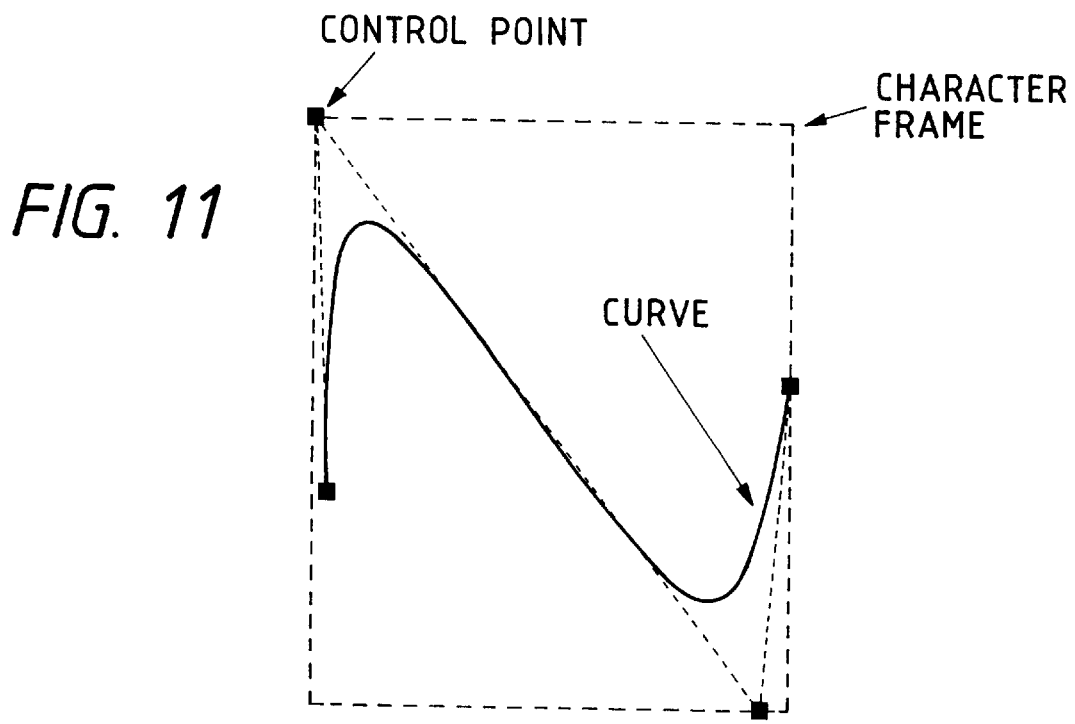
FIG. 11 is a diagram showing an example of the relation between a curve and a character frame.

FIG. 9 shows the third embodiment of the invention and relates to an example of a printer having an outline font converting apparatus of the first and second embodiments. In FIG. 9, reference numeral 906 denotes an input interface for receiving print data and control code; 901 a CPU for executing control of a printer, calculations for development and drawing of an outline font, and the like; 903 a ROM in which a control procedure, character data, and the like of the printer have been stored; 902 a RAM which is used as a work area for calculations of the CPU 901, a development of an image to be printed; 907 a video interface for outputting image data, as a video signal, formed in the RAM 902 by the CPU 901; and 908 an output section for converting the video signal into ON/OFF signal of a pulse, converting the pulse signal to an ON/OFF signal of a laser beam, irradiating the ON/OFF laser beam onto a photosensitive drum, depositing a toner thereon, transferring the toner image onto a paper, and fixing the transferred image, thereby printing.

The operation of an outline data converting section in the printer will now be described. When the character code of the printer is received, character outline data corresponding to the code is read out from the ROM 903. The CPU 901 accurately converts the readout data to outline font data having a character frame in accordance with a procedure similar to the first embodiment and stores into the RAM 902. Subsequently, the data in the RAM 902 is scaled in accordance with an output character size, thereby obtaining a character BBox. A necessary memory size is calculated by using the character BBox. A work area is set in the RAM 902 on the basis of the memory size. An outline of the character is drawn in the work area in the RAM 902, and the inside of the outline is painted, thereby forming a bit map image. The bit map image of the character is transferred to a predetermined position in a frame buffer that is ordinarily set in the RAM 902, thereby forming an output image. The above operations are executed until a paper delivery command arrives or until the end of the formation of an output image of one page. When the paper delivery command arrives or the formation of the output image of one page is finished, the image is sent to the video interface. The output section receives the video signal, forms the image onto the paper by the toner, and prints it.

As mentioned above, by dividing the outline into segments at the maximum and minimum values of the outline of the curve before the character is developed, the maximum area that is occupied by the outline of the character can accurately be calculated, the memory can be more efficiently used and the amount of data that is transferred to the frame buffer reduced. Thus, the overall throughput can be raised. Since the size of character can accurately be known, the calculation of the positional relation with the right margin and the calculation of the character width in case of drawing an underline can be executed easily.

Although the example in which the apparatus is assembled in a printer has been described above, the invention is not limited to a printer but can be also applied to a whole system such as a display or the like using outline fonts.

The "character" used in the invention incorporates a symbol and a figure.

According to the invention as described above, since the apparatus is constructed as mentioned above, the following effects (1) to (4) are obtained. That is, (1) The number of memories necessary to develop the character can be minimized.

(2) Since only the necessary amount of memory is used, data transfer after the development can be executed at a high speed.

(3) Since the accurate width of each character can be calculated easily, the processes can be executed at a high speed.

(4) Even if an expression of the curve is changed, the area that is occupied by the character does not change and the system with few errors can be constructed.

What is claimed is:

1. A data conversion apparatus comprising:

input means for inputting curve data among data indicative of an outline of a pattern;

discrimination means for discriminating whether a control point of the curve data input by said input means lies beyond a predetermined area;

extremum determination means for determining whether or not a maximum or minimum exists in a curve represented by the input curve data;

division means for dividing the curve into segments, wherein said division means does not divide the curve if said discrimination means discriminates that the control point does not lie beyond the predetermined area, and said division means does not divide the curve if said extremum determination means determines that the maximum or minimum does not exist in the curve, and wherein said division means divides the curve at a position of the maximum or minimum if said discrimination means discriminates the control point lies beyond the predetermined area and if said extremum determination means determines that the maximum or minimum exists in the curve; and output means for outputting curve data corresponding to the curve.

2. An apparatus according to claim 1, wherein the predetermined area represents a rectangle circumscribed in the pattern.

3. An apparatus according to claim 2, further comprising means for deriving the rectangle.

4. An apparatus according to claim 1, wherein the pattern comprises a character pattern.

5. An apparatus according to claim 1, further comprising a printer for printing the pattern.

6. A method for a data conversion apparatus, said method comprising the steps of:

inputting curve data among data indicative of an outline of a pattern;

discriminating whether a control point of the input curve data lies beyond a predetermined area;

determining whether or not a maximum or minimum exists in a curve represented by input curve data;

dividing the curve at a position of the maximum or minimum if the control point lies beyond the predetermined area and if the maximum or minimum exists in the curve, wherein the curve is not divided if the control point does not lie beyond the predetermined area, the curve also not being divided if the maximum or minimum does not exist in the curve; and outputting curve data corresponding to the curve.

7. A method according to claim 6, wherein the predetermined area represents a rectangle circumscribed in the pattern.

8. A method according to claim 7, further comprising the step of deriving the rectangle.

9. A method according to claim 6, wherein the pattern comprises a character pattern.

10. A method according to claim 6, wherein said output step includes outputting the curve data using a printer.

11. A computer-usable medium storing computer-usable instructions for a program-controlled data processing apparatus, said instructions comprising instructions for causing the apparatus to:

input curve data among data indicative of an outline of a pattern;

discriminate whether a control point of the input curve data lies beyond a predetermined area;

determine whether or not a maximum or minimum exists in a curve represented by input curve data;

divide the curve at a position of the maximum or minimum if the control point lies beyond the predetermined area and if the maximum or minimum exists in the curve, wherein the curve is not divided if the control point does not lie beyond the predetermined area, the curve also not being divided if the maximum or minimum does not exist in the curve; and output the curve data corresponding to the curve.

12. A computer-usable medium according to claim 11, wherein the predetermined area represents a rectangle circumscribed in the pattern.

13. A computer-usable medium according to claim 12, said instructions further comprising instructions for causing the apparatus to derive the rectangle.

14. A computer-usable medium according to claim 11, wherein the pattern comprises a character pattern.

15. A computer-usable medium according to claim 11, wherein said output instructions cause the apparatus to output the curve data using a printer.

* * * * *

UNITED STATES PATENT AND TRADEMARK OFFICE
CERTIFICATE OF CORRECTION

PATENT NO.  : 5,859,647

DATED       : January 12, 1999

INVENTOR(S) : TSUNEAKI KURUMIDA

It is certified that error appears in the above-identified patent and that said Letters Patent is hereby corrected as shown below:

COLUMN 3

Line 29, "an" should read --a--.
Line 62, "RAM" should read --a RAM--.
Line 64, "ROM" should read --a ROM--.

COLUMN 5

Line 60, "is" should read --has--.

COLUMN 9

Line 11, "discriminates" should read --discriminates that--.

Signed and Sealed this

Sixteenth Day of November, 1999

Attest:

Q. TODD DICKINSON

*Attesting Officer*          *Acting Commissioner of Patents and Trademarks*